United States Patent
Hasek et al.

(10) Patent No.: US 8,713,620 B2
(45) Date of Patent: *Apr. 29, 2014

(54) METHODS AND APPARATUS FOR PROVIDING VIDEO ON DEMAND AND NETWORK PVR FUNCTIONS USING IP STREAMING

(75) Inventors: Charles Hasek, Broomfiled, CO (US); Kenneth Gould, Oakton, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,112

(22) Filed: Apr. 19, 2012

(65) Prior Publication Data

US 2013/0074132 A1   Mar. 21, 2013

Related U.S. Application Data

(63) Continuation of application No. 11/284,427, filed on Nov. 21, 2005, now Pat. No. 8,181,209.

(51) Int. Cl.
*H04N 7/173* (2011.01)

(52) U.S. Cl.
USPC .............................. 725/93; 725/116

(58) Field of Classification Search
None
See application file for complete search history.

(56) References Cited

U.S. PATENT DOCUMENTS

| 2003/0088876 A1* | 5/2003 | Mao et al. ........................ 725/91 |
| 2004/0128693 A1* | 7/2004 | Weigand ........................ 725/95 |
| 2007/0094691 A1* | 4/2007 | Gazdzinski ..................... 725/62 |

* cited by examiner

*Primary Examiner* — Jason K Lin
(74) *Attorney, Agent, or Firm* — Straub & Pokotylo; Michael P. Straub; Stephen T. Straub (57) ABSTRACT

Methods and apparatus for supporting on-demand content services, using conventional non-IP based VOD servers are described. The methods and apparatus of the present invention, through the use of a protocol converter and/or a content redirector, can be used to enable a conventional VOD server to supply content to a customer premise equipment (CPE) device which supports IP based content delivery and/or RSTP control of content delivery. The protocol converter of the invention can be implemented as an RTSP-ISA PROXY. The RTSP Proxy converts messages between RTSP (Real-Time Streaming Protocol) to the appropriate ISA protocol signal or another protocol format. The proxy module handles the conversion between these formats and converts a received signal, e.g. message, into the format required by the device which responds by implementing the operation requested by the signal.

19 Claims, 5 Drawing Sheets

| Command | SSP/LSCP | RTSP |
|---|---|---|
| Play Time | NPT | NPT |
| Session Setup Connection | SSP - Attach and Create Stream | rtsp://<host:port>/<asset> + Session Setup |
| Session Teardown | SSP - Detach and Destroy Stream | Teardown |
| FFWD Trick Mode | Play (- Num/Den) | Play (- Num/Den) |
| REW Trick Mode | Play (+ Num/Den) | Play (+ Num/Den) |
| Pause Mode | Pause (NPT) | Pause (NPT) |
| Play Mode | Play (Start NPT, End NPT) | Play (Start NPT, End NPT) |
| | | |
| | | |

Figure 4

METHODS AND APPARATUS FOR PROVIDING VIDEO ON DEMAND AND NETWORK PVR FUNCTIONS USING IP STREAMING

RELATED APPLICATION

This application is a continuation of U.S. application Ser. No. 11/284,427 filed Nov. 21, 2005, now U.S. Pat. No. 8,181,209 titled "METHODS AND APPARATUS FOR PROVIDING VIDEO ON DEMAND AND NETWORK PVR FUNCTIONS USING IP STREAMING" which is hereby expressly incorporated by reference in its entirety.

FIELD OF THE INVENTION

The present invention relates to methods and apparatus for delivering video content and, more particularly, to methods and apparatus for using video on demand (VOD) servers, to deliver content to be supplied over an IP network.

BACKGROUND OF THE INVENTION

The delivery of video and other types of content as part of an on-demand service has traditionally been, at least with respect to cable networks, through the use of a VOD server that outputs the requested content as a QAM (Quadrature Amplitude Modulated) signal that is delivered over a cable system to one or more set top boxes. The set top boxes process the signal and supply it to a display device such as a TV set.

Network personal video recorder (NPVR) functionality can be supported by many current VOD servers. NPVR functionality allows a user to use commands of the type normally supported by a video recorder, e.g., fast forward, pause, rewind, etc. The VOD server implements the command or commands and supplies the resulting video stream to the on-demand user.

VOD and NPVR products are two exciting cutting edge products being offered by the cable industry today. However, current VOD servers are primarily designed to work with conventional business management systems and customer premise equipment (CPE), e.g., set top boxes, designed specifically for the cable industry. A business management system may be implemented as a module. In some embodiments the business management systems are implemented as stand alone servers where each server operates as a module in the overall system.

Existing VOD servers used by the cable industry today tend to support standardized protocols explicitly developed for the cable industry with VOD services in mind. The most widely used protocols for VOD services provided by the cable industry are the ISA protocol suite which is part of the Interactive Services Architecture. These protocols are generally referred to as ISA protocols and include a Lightweight Streaming Control Protocol (ISA LSCP), ISA Session Set Up protocol (ISA SSP) and various other ISA protocols. ISA protocols are described at www.interactiveservices.org. Time Warner Cable's Session Setup Protocol (SSP) Version 2.3 dated May 19, 2003 and Lightweight Stream Control Protocol (LSCP) Version 1.1 dated Sep. 5, 2003 which are available at the www.interactiveservices.org website are both hereby expressly incorporated by reference. Additional information on ISA Lightweight service protocols is provided in: 1) the LSCP Implementation Specification Version 1.0 dated Apr. 12, 2004 (TWC-LSCPI-SP-1.0); 2) CableLabs Video-On-Demand Content Specification 1.1 (MD-SP-VOD-CONTENT1.1-I03-040107 dated Jan. 7, 2004 and 3) CableLabs Asset Distribution Interface Specification Version 1.1 (MD-SP-ADI1.1-I03-040107 dated Jan. 7, 2004 each of which is hereby expressly incorporated by reference. A derivative system which uses ISA commands to implement VOD functionality which is also used by many cable companies is the OpenStream system described at www.tandbergtv.com which is an on-demand digital service platform and related protocols that allow cable operators to provide on-demand video services. These cable industry standards are used to provide the backend management functions and interface/APIs for many VOD systems currently in use by the cable industry today. Backend management functions may include such things as, session set up, controlling delivery authorization for users, NPVR functions, and billing functions. Control of delivery may include supporting one or more NPVR features, in response commands received from a CPE device. Thus NPVR may be supported once a stream begins being delivered.

Various video on-demand systems, at least some of which can support network based digital video recorder (network DVR) functionality and which can be used in conjunction with the methods and apparatus of the invention are described in U.S. Patent Application Publications: U.S. 2002-0129358, U.S. 2002-0100059 and U.S. 2002-0104093, which are hereby expressly incorporated by reference.

Existing VOD systems have proven suitable for delivering VOD to typical cable system client devices, e.g., set top boxes. However, recent advances in broadband network used to deliver IP packet streams and IP devices, such as personal computers, personal digital assistants (PDAs), etc. have opened up new opportunities for the delivery of content, e.g., video on-demand.

As video capable IP devices become more numerous, there is an increasing demand for cable companies and other suppliers of content to be capable of delivering video to such non-traditional devices and clients over broadband and wireless connections using IP packet streams. IP devices often rely on Real Time Streaming Protocol (RTSP) signaling to control on-demand streaming. RTSP is a client-server multimedia presentation control protocol, designed to address the need for efficient delivery of streamed multimedia over IP networks. RTSP is described in the Internet Society's Network Working Group Request for Comments (RFC) 2326 dated 1998 which is hereby expressly incorporated by reference. Unfortunately, as discussed above, existing VOD servers used by the cable industry tend to use the ISA protocols as opposed to RTSP to control on-demand services. In addition, many VOD servers in use by the cable industry today to supply VOD content to set top boxes do not support IP packet streaming as a delivery option. Accordingly, much of the VOD equipment currently in use by the cable industry is unable to interact with IP based devices due to protocol difference and due to the failure of many existing VOD servers to support RSTP and/or IP streaming.

One approach to addressing the need to support video delivery to IP clients has been to develop IP business management systems and IP video servers for controlling and delivering video and other content as IP streams to IP client devices, e.g., over a broadband connection which supports IP.

This approach while avoiding the protocol and delivery incompatibility issues has the unfortunate result of requiring duplication of many resources, e.g., servers, content storage, etc. which have already been developed and deployed to support VOD services to non-IP based set top boxes. Such an approach may be suitable for some applications, e.g., IPTV streaming, where the same set of IP video streams are broadcast to a large number of users justifying the cost of new hardware given the number of user's which will benefit from the service. Providing new hardware to support IPTV streaming is, in some respects, easier than implementing new VOD services since the large library of content which may be required to support meaningful VOD services need not be stored and made available on demand.

In view of the above discussion, it should be apparent that it would be desirable if methods and/or apparatus could be developed which would allow existing VOD equipment which supports the ISA protocol and QAM based video delivery normally associated with non-IP set top box VOD systems, to be used to support on-demand content services, e.g., VOD services, for IP client devices such as personal computer based clients and/or IP-video-based STBs. It would be particularly desirable if such methods and apparatus could be used to support RTSP based on-demand services. It would also be desirable if the developed methods could be used to bridge existing non-IP VOD/NPVR systems and IP based systems while still allowing for expansion and flexibility in each of the separate systems over time.

SUMMARY OF THE INVENTION

The present invention is directed to methods and apparatus for supporting on-demand content services, using conventional non-IP based VOD servers. The methods and apparatus of the present invention, through the use of a protocol converter and/or a content redirector, can be used to enable a conventional VOD server to supply content to a customer premise equipment (CPE) device which supports IP based content delivery and/or RSTP control of content delivery.

The protocol converter of the invention can be implemented as an RTSP-ISA PROXY. The RTSP Proxy converts messages between RTSP (Real-Time Streaming Protocol) to the appropriate ISA protocol signal or another protocol format. Conversion can be between any one of RTSP, (ISA Lightweight Streaming Protocol, ISA SSP (ISA Session Setup Protocol), DSM-CC (ISO MPEG-2 Digital Storage Media Command and Control) and/or other ISA (Interactive Services Architecture) signals and vice versa. The proxy module handles the conversion between these formats and converts a received signal, e.g. message, into the format required by the device which responds by implementing the operation requested by the signal.

Accordingly, the RSTP-ISA proxy converts between different protocol formats which can be used to control session initiation and content delivery.

The RSTP-ISA proxy module of the invention serves as a bridging device allowing an IPTV business management system to interact with a non-IP Business management system. The RSTP-ISA proxy also allows content delivery control signals to be exchanged between an IP based client device which supports the RTSP signaling format and a VOD server which uses signals having an ISA format. Thus, in various embodiments, the RSTP-ISA proxy converts RSTP signals from devices using RSTP signaling into an ISA format, or another format which is used by the IP client devices. In addition, the RSTP-ISA proxy converts ISA signals from devices using ISA signaling into an RTSP format which is used by devices which support RTSP signaling. In this manner, the RSTP-ISA PROXY serves as a bridge for control and other signaling between devices using RTSP signaling and devices using ISA signaling. Thus, existing VOD devices using ISA signaling for control and other purposes can be used with devices using RTSP signaling.

Once a session is initiated, the IP based CPE device can communicate and interact with the cable network VOD server through the RTSP-ISA proxy. The use of the proxy allows the IP based CPE device to obtain NVPR functionality through the use of commands which are subjected to protocol conversion by the RTSP-ISA proxy so that they can be interpreted and implemented by the cable network VOD server.

A video redirector module is used in some embodiments of the present invention to support IP based delivery of content received from a content server, e.g., VOD server, which does not support IP streaming. In some but not necessarily all embodiments, the video redirector includes a media processor. The redirector module takes the video out of the VOD server and forwards the video in the appropriate format to the CPE client. In some implementations, the video redirector is treated by the VOD server as corresponding to a unique service group or groups. The unique service group or groups are indicated to the VOD server 112 as corresponding to IP broadband clients. The video redirector can, when necessary, convert digital video from one format to another. In some embodiments, for example, the video redirector converts video received in an MPEG-2 to a H.264 format in which the video is delivered to the CPE device. The video redirector may in addition or as an alternative to format conversion, alter the bit rate of a video stream as required. This function may be performed by a media processor in the video redirector. Through the use of the present invention, the VOD server 112 can be used as a NPVR device which can be used to provide NPVR functions to IP based clients such as personal computer (PC) based IP video client modules and/or IP based video STBs.

Thus, the video director receives the content to be supplied to an IP based client device. The content may be received by the redirector module using QAM signaling as might be used to deliver video content to a set top box. The redirector module reformats the received content generating an IP packet stream there from for delivery to IP based client device. In this manner, the video redirector module acts as a bridging device. The redirector module allows the output of a conventional VOD server to be used to support VOD to an IP client which might not be able to use the output of the conventional VOD server directly.

The RTSP-ISA proxy may be used without the video redirector module in cases where the VOD server can output an IP stream for delivery to the client devices.

By using the RTSP-ISA Proxy and Video Redirector module of the invention, ISA signaling can continue to be used in the cable portion of the content delivery system while RSTP signaling can be used in the portion of the delivery system dedicated to IP streaming. Both portions of the system can continue to be updated relatively independently with the RTSP-ISA proxy and Video redirector of the invention allowing the different portions of the content distribution to interact with one another.

In combination with the RSTP-ISA proxy and video redirector of the invention, an IP Business management system may be used to manage and track sessions and purchases corresponding to IP based client devices. The business management system may be implemented using one or more modules.

Various additional features and advantages of the present invention are discussed in the detailed description which follows.

DETAILED DESCRIPTION

As discussed above, the present invention is directed to methods and apparatus for supporting on-demand content services, using conventional non-IP based VOD servers e.g., VOD servers which do not support RSTP control signals.

Figure 1:
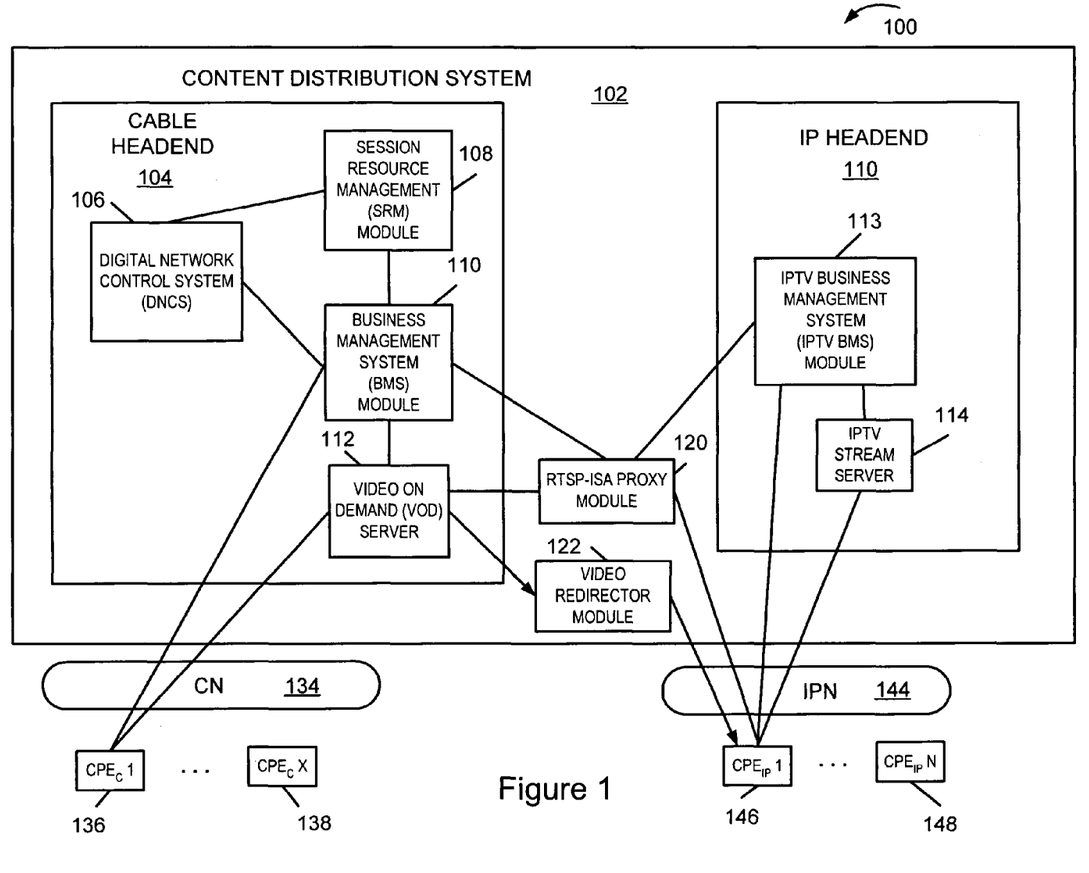
FIG. 1 illustrates an exemplary content delivery and distribution system implemented in accordance with the present invention.

FIG. 1 illustrates an exemplary content delivery and distribution system 100 implemented in accordance with the present invention. The system 100 includes a content distribution system 102 which is coupled to a first plurality of customer premise equipment devices 136, 136 by way of a cable network 134. The content distribution system 102 is coupled to a second plurality of customer premise equipment devices 146, 148 by way of a broadband, e.g., IP based, network (IPN) 144. As can be appreciated, a cable network can be used to provide IP signals and, accordingly, the broadband network 144 may, in fact, be part of the cable network (cn) 134. In some embodiments the broadband network includes a Digital Subscriber Line (DSL) connection. Thus, network 134 could be used to deliver conventional cable TV content as well as broadband signals such as IP streams.

The first set of CPE devices 136, 138 are cable network devices, e.g., set top boxes, which support QAM delivery of information content but not IP delivery. A subscript "c" is used with respect to these devices 136, 138 to indicate that they are conventional cable network type devices. Such cable set top boxes which do not support IP are sometimes referred to as "legacy" set top boxes since they tend to be older boxes which remain in the system despite more current set top boxes which include additional support for IP digital packet based delivery of video content. The second set of CPE devices 146, 148 are IP devices, e.g., personal computers, PDAs, IP based game devices, etc. which support IP packet stream based content delivery and RSTP control signaling. A subscript "IP" is used with respect to these devices 146, 148 to indicate that they are IP/RTSP type devices.

The content distribution system 102 is illustrated, for purposes of explaining the invention, as including a cable head end 104 and an IP head end 110 which are coupled together by the RTSP-ISA proxy 120 of the present invention and the video redirector module 122 of the invention. The cable head end 104 and IP head end 110 can, and sometimes are, located in physically distinct buildings. The grouping of elements into such an arrangement is largely for purposes of explaining the invention. It should be appreciated that the components of the cable head end 104, IP head end 110, RTSP-ISA proxy and video redirector module 122 may be located at a single location or implemented at separate locations and coupled together via one or more communications links. The RSTP-ISA proxy 120 operates as a protocol converter module. The RTSP-ISA proxy 120 may convert between SSP/LSP (DSM-CC) and RTSP signals using the mapping shown in FIG. 4. This signal mapping information may be stored in memory within the RTSP-IS proxy module 120 and used by a processor to determine what, if any signal conversion operations are to be preformed to convert between the various signal formats.

The cable head end 104 includes a session resource management (SRM) module 108, a business management system module 110, a digital network control system module 106 and a video on-demand (VOD) server module 112. The various elements of the cable head end are coupled together as shown. Each module 106, 108, 110, 112 can be implemented as, e.g., separate servers. However, it is also possible to combine one or more of the modules into a single device. While being shown as coupled to a single CPE device 136, it should be appreciated that the BMS 110 and VOD server 112 are each coupled to multiple ones of the first set of CPE devices 136, 138. The VOD server 112 supplies these devices 136, 138 with video streams in response to requests for on-demand content. In addition to being coupled to CPE devices, the VOD server 112 is also coupled to the video redirector module 122 of the present invention and the RTSP-ISA proxy module 120. The BMS 110, like the VOD server 112, is coupled to the RTSP proxy module 120.

The IP head end 110 includes an IPTV business management system (IPTV BMS) module 113, and an IP stream server module 114. The IP stream server module 114 provides IP TV broadcast streams to multiple CPE devices 146, 146, e.g., in parallel. Each of the IPTV BMS module 113 and IPTV stream server module 114 are coupled to one or more of the CPE devices 146, 148. Both the CPE devices and modules 113, 114 support IP streams and RTSP signaling. However, in many embodiments, the modules 113, 114 and CPE devices 146, 148 do not support ISA signaling protocols. The modules 113, 114 can be implemented as separate servers.

Referring now to the elements of the cable head end system 104, the DNCS 106 serves as the main cable head end controller controlling overall operation of the other modules in the head end 104. The DNCS 106 interacts with the session resource management module 108 which is responsible for allocating and controlling communications resources for content delivery authorized by the business management system (BMS) 110. The BMS 110 is responsible for interacting with CPE equipment, authorizing delivery of requested content generating a billing record and instructing the VOD server 112 to supply the requested content to the CPE device making the request. The BMS 110 is responsible for the initial authorization of content delivery in response to a content delivery request, e.g., session establishment signal, and maintains billing information associated with the delivery of requested content. A cable based CPE device 136, 138 may send a content delivery request, e.g., in an ISA format, directly to BMS 110. Content delivery requests to be serviced by the cable headend from CPE devices 146, 148, e.g., using RTSP signaling, are communicated to the BMS 110 via RTSP-ISA proxy 120 which, converts signals, e.g., the RTSP requests or session establishment signals to ISA format for processing by the BMS 110.

Once delivery of a particular asset, e.g., a piece of video content, has been authorized, the BMS server 110 instructs the VOD server 112 to begin streaming the authorized asset. Once streaming begins, a user of a cable device can interact with the VOD server 112 and instruct the server to modify, change or make other adjustments to the content being streamed to implement NVPR commands such as fast forward, pause, rewind, etc.

The IP Business management system 113 in the IP head end 110 provides similar session initiation, authorization, and billing functions to IP based client devices 146, 148 requesting content delivery. These functions are similar to the functions performed by the BMS 110 in response to content delivery requests from cable client devices 136, 138. The IPTV stream server 114 provides IP video streams, e.g., broadcast streams, to the CPE device 146, 148 under control of the IPTV BMS. These streams are normally scheduled broadcast streams in contrast to VOD streams generated in response to a content request. In this manner, the CPE devices 146, 148 are supplied with IPTV broadcasts to the extent they are authorized to receive the broadcasts by the IPTV BMS 113.

In accordance with the invention, on demand content requests, including session initiation signals, from one or more of the second CPE devices 146, 148 are first sent to the IPTV BMS 113 for processing. The IPTV BMS 113 is responsible for session initiation, authorization, and maintaining billing information corresponding to the user account associated with the CPE device 146, 148 in the second set of user devices from which the request was received.

Upon authorizing delivery of requested content which is to be supplied by the cable head end VOD server 112, the IPTV BMS 113 will send a content delivery request through RTSP-ISA proxy to the BMS 110 in the cable head end. The RTSP-ISA proxy 120 converts RTSP signals and/or other signals in the content delivery request to ISA compliant signals which can be processed by the BMS 110. The BMS will generate billing information which can be shared with the IPTV BMS through the proxy 120. After Authorizing content delivery, the BMS 110 instructs the VOD server 112 to supply the requested content to the video redirector 122 for ultimate delivery to the requesting CPE device 146 or 148. Once streaming has been initiated, a CPE device 146, 148, using RTSP signaling can interact with the VOD server 112 which is responsible of implementing PVR commands sent by the CPE device. The communication between the CPE device 146, 148 and the VOD server 112 is via the RTSP-ISA proxy 120. The RTSP-ISA proxy 120 performs the required format conversion between RTSP and ISA formats allowing the CPE device 146, 148 to interact with the VOD server 112 without the CPE device having to directly communicate with or support ISA signaling.

The video redirector 122, receives the content being streamed from the VOD server. The redirector 122 will take the video output of the VOD server 112 and then forward it in the appropriate format and/or bit rate to the CPE client 146. Accordingly, the output of the video redirector module 122 will be an IP stream generated from the output of the VOD server 112. The IP stream will normally include a destination IP address corresponding to the IP CPE device to which the stream is to be directed. The generation processes may include encoding or re-coding the content, e.g., video content, into an MPEG compliant stream. The process may also include packetizing the stream for delivery and one or more rate shaping operations to limit the bandwidth of the IP stream being generated to a rate which can be delivered successfully. Accordingly, it should be appreciated that the video redirector 122 can, and in some embodiments does, convert the output of the VOD server 112 from one format to another, e.g., from MPEG-2 to H.262. The video redirector 122 may, but need not, also perform rate shaping operations, e.g., to limit the delivered stream to a particular data rate which can be supported by the connection between the video redirector 122 and CPE device 146, 148. As is known in the art, the data rate which can be supplied reliably to the CPE device 146, 148 may be limited by bandwidth constraints of the IP network 144. Accordingly, the video redirector's rate shaping capability can be useful in the case rate contained network connection.

Figures 2, 2A:
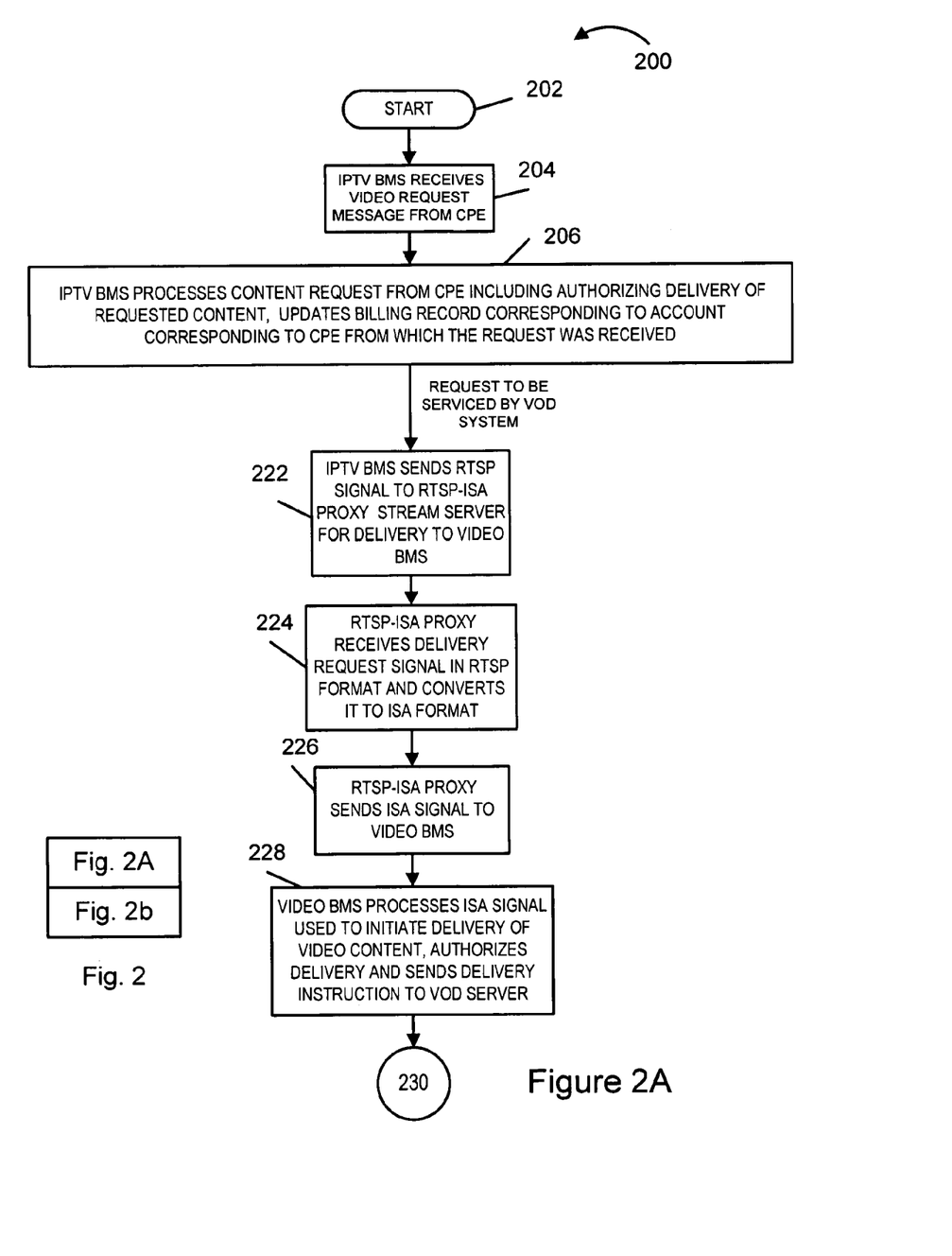
FIG. 2, which comprises the combination of FIGS. 3A and 3B illustrates the steps of a content delivery method implemented in accordance with the invention where a VOD server supplies content to an IP based CPE client device.
Figure 3:
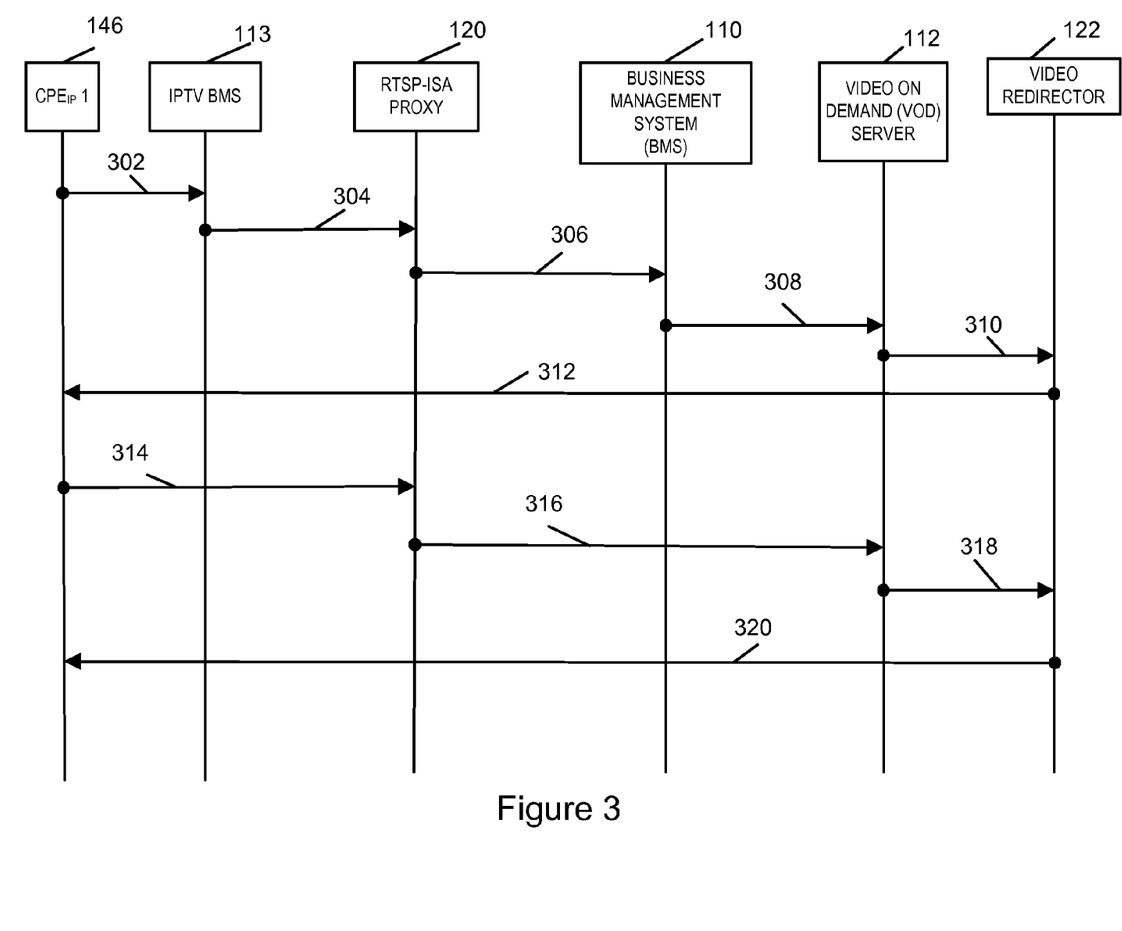
FIG. 3 illustrates am exemplary signaling diagram associated with providing a VOD service in accordance with the invention.

Having generally described the elements and functions of the content distribution system 102 the process of a signal initiating a VOD session and providing ongoing support for an initiated VOD session will now be described with reference to FIGS. 2 and 3. FIG. 2 shows the steps associated with initiating and supporting a VOD session in accordance with the present invention while FIG. 3 is a signaling diagram showing the communication of signals between various system components as a VOD session is established and maintained.

The process 200 shown in FIG. 2 starts in step 202 with the IPTV BMS 113 waiting to receive a session initiation request, e.g., a signal from CPE device 146 indicating that the CPE device 136 is seeking to initiate a VOD session. In step 204, the IPTV BMS 113 receives a VOD session initiation request from a CPE device, e.g., CPE device 126. In FIG. 3, signal 302 which is sent from CPE device 146 to IPTV BMS 113, corresponds to the VOD session initiation request signal received in step 203.

Operation proceeds from step 204 to step 206 in which the IPTV BMS 113 processes the content delivery request signal 302, authorizes the delivery of the requested content. The IPTV BMS 113 also updates a billing record corresponding to the account of CPE device 146 from which the VOD request was received to make sure the subscriber is billed for the VOD service being provided. When the IPTV BMS 113 determines that it will authorize the request and that the request is to be serviced by the VOD server 112 in the cable head end, operation proceeds to step 222. In step 222 the IPTV BMS 113 sends a session initiation signal to the RTSP-ISA proxy 120 for delivery to the BMS server 110. This signal corresponds to signal 304 of FIG. 3.

In step 224, the RTSP-ISA proxy module 120 receives the session initiation request signal 304 and converts it to an ISA format which is the signal format supported by the BMS 110. Then, in step 226, the RTSP-ISA proxy 120 sends the session initiation signal to the video BMS 110 for processing. This signal is shown as signal 306 in FIG. 3.

In step 228, the video BMS 110 receives and processes the ISA session initiation signal 306. The video BMS 110 authorizes the delivery of the video content, updates a billing record corresponding to the content delivery request, and send a delivery instruction to the VOD server 112. The signal to the VOD server 112 is illustrated in FIG. 3 as signal 308.

Figure 2B:
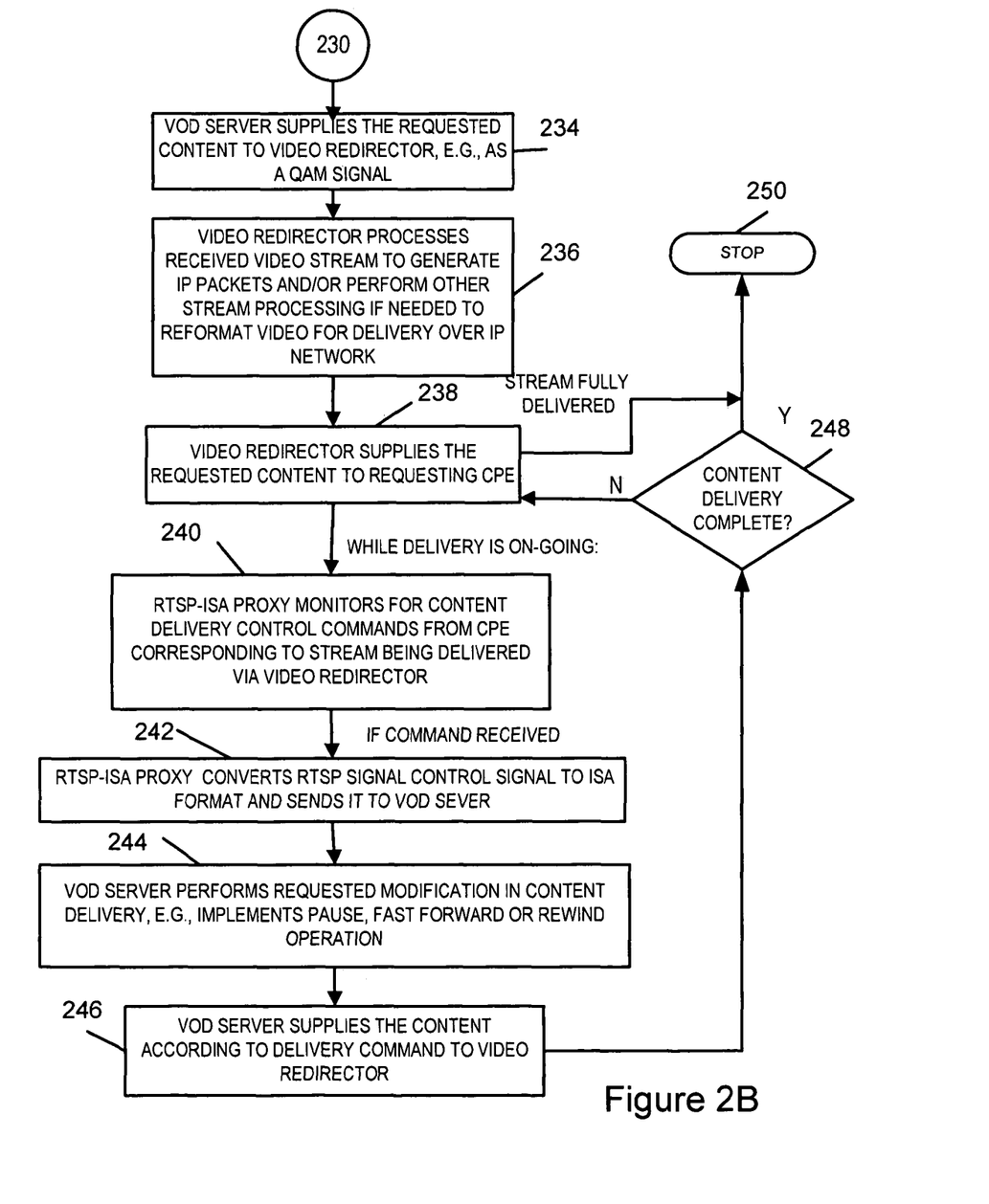

Operation proceeds from step 228 to step 234 via connecting node 230 which is merely used to show the connection between FIGS. 2A and 2B.

In step 234 the VOD Server 112, in response to receiving the signal from the BMS 110, begins supplying the requested content to the video redirector 122. The sending of at least the initial portion of the requested content is shown as signal 310 of FIG. 3.

In step 236 the video redirector 122 processes the received video stream to generate an IP packet stream suitable for delivery to the requesting IP based CPE device 146. As discussed above, this processing may involve re-encoding the content to change the encoded format as well as other operations including packetization and/or data rate shaping operations used to control the bandwidth of the IP stream that is generated. Next in step 238, the video redirector 122 begins sending the requested content, now in the form of an IP packet stream, to the requesting CPE device 136. The sending of the IP content packet stream is represented by signal 312 of FIG. 3.

While the content stream is being delivered, the viewer, e.g., user of CPE device 146, may issue one or more video recorder control commands through the CPE device 146, e.g., pause, fast forward, reverse, etc, requiring a modification or change in the content being delivered as part of implementing the command. During content delivery, the VOD server 112, in step 240, monitors for one or more commands from the CPE device 146. Such commands are received via the RSTP-ISA proxy module 120 which is responsible for any format conversions which may be required, e.g., RTSP to ISA format conversions. Signal 314 of FIG. 3 represents a playback control command sent from the CPE device 146 to the RTSP-ISA proxy module 120 for delivery to the VOD server 112. In step 242, which is performed for commands received by the RTSP-ISA proxy 120 from the CPE device 146 while content is being delivered to the CPE device 146, the RTSP-ISA proxy 120 converts the received RTSP signal to an ISA format signal and sends the signal to the VOD server 112. The playback control signal sent to the VOD server 112 is represented by signal 316 in FIG. 3.

Next, in step 244 the VOD server 112 implements the delivery command and changes the content stream being sent to the video redirector 122 in accordance with the command. Thus, the video redirector 122 may receive a fast forward video stream, e.g., if the command was a fast forward command or a reverse video content stream if the command was a reverse command. The content stream supplied following the receipt of the playback command is represented by signal 318 of FIG. 3.

The video redirector 122 processes the content stream 318 and produces there from an IP packet stream for delivery to the IP based CPE device 136. The delivered IP packet stream which reflects implementation of the playback control command is represented in FIG. 3 by signal 320.

Operation proceeds in the process shown in FIG. 2 from step 246 to step 248. In step 248 a determination is made as to whether or not delivery of the requested content has been completed. If the content has been completely delivered, operation proceeds from step 248 to stop step 250 where delivery of the requested content and processing associated therewith stops. However, if after implementation of a content delivery control command content remains to be delivered, operation proceeds again to step 238 wherein the VOD server 112 and video redirector 122 continues to supply the requested content.

If at any time while content is being supplied, it is determined that the content has been fully delivered, operation proceeds to stop step 250 wherein processing with respect to the content delivery request stops.

The process described with respect to FIGS. 2 and 3 may be performed for multiple content delivery requests in parallel. The requests can correspond to different IP based CPE devices 146, 148 and/or multiple content delivery requests from a single CPE device 146 can be serviced in parallel at the same time.

Using the above described methods and apparatus of the present invention, it should be appreciated that existing VOD servers which use ISA signal formats can be used to support on demand content delivery to IP based CPE devices. This is possible even if the IP CPE devices use RSTP and/or other signaling protocols which are not directly supported by the ISA based video server expected to provide the content being requested since the ISA/RTSP proxy resolves any signal format incompatibility.

Figure 4:
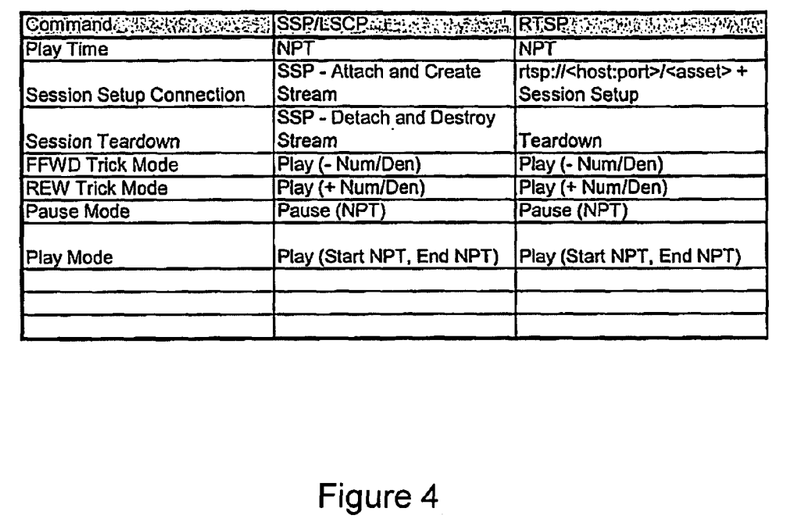
FIG. 4 shows an exemplary mapping between SSP/LSCP to RTSP signals which may be used by the RTSP-ISA proxy module to convert between the two protocol formats.

As can be appreciated, while the FIG. 4 illustration may give the appearance that there is a large similarity between RTSP and ISA formats, the syntax, organization and sometimes various fields may differ between commands in the different formats which perform the same or similar functions. The RTSP/ISA proxy is responsible for converting between these different formats. A few examples which elaborate on various examples of the RTSP and ISA formats and show some of the differences and possible conversions there between are shown below for the common cases of stream setup/plan and fast forward commands.

A stream setup and play example will first be described. For the RTSP Stream Setup command and the corresponding ISA Play command the formats are as follows:

RTSP Stream Setup Command Format:
   Format:

SETUP rtsp://<server:port>/<Service Group>/<Provider>/<Product>/<Asset Title - Offering ID>

ISA StreamModule Stream Play (SSP) Command Format:
   Format:

StreamModule::Stream play (
   in SessionModule::Session aSession,
   in long aServiceGroup
)

where: aSession will transmit private data from the RTSP-ISA proxy which will contain Provider, Product and Asset Title/Offering ID.

Examples of an RTSP Stream Setup command a corresponding ISA Play command which may be generated by the ISA/RTSP proxy of the invention are set forth below.

RTSP Stream Setup Example:

C->S: SETUP rtsp://isa-proxy-server.com:554/100/HOD/SVOD/100001
   CSeq: 302
   Transport: UDP;unicast;client_port=257
   100001 maps to Sopranos Season 1 - Episode 1

ISA Play Example:

StreamModule::Stream play (
   in SessionModule::Session <aSession >
   in long 100
)

where: aSession will transmit private data from the RTSP-ISA proxy which will contain Provider, Product and Asset Title/Offering ID.

A fast forward command example will now be described. The format of the RTSP Play command which allows for a fast forward playback will first be described. This description is followed by the ISA format of a similar fast forward playback command. The two different fast forward play command formats are as shown below:

RTSP Format:
   Format:

PLAY rtsp://<server:port> RTSP/1.0
   CSeq: <command sequence id>
   Session: <unique session id>
   Range: npt=<time range>
scale=<numerator/denominator>

ISA Format:
Format:
Common Header
All requests and responses have the following format:

| Field | Length (bytes) | Type | Description |
| --- | --- | --- | --- |
| Version | 1 | unsigned | Protocol version number |
| Transaction ID | 1 | unsigned | Transaction Id |
| Op code | 1 | enumerated | Identifies request/response |
| Status code | 1 | enumerated | Only on responses |
| Stream handle | 4 | opaque | Identifies stream- allocated when stream created |
| Data | Variable |  | Request/Response dependent |

LSC Play

| Data Field | Length (bytes) | Type | Description |
| --- | --- | --- | --- |
| Start NPT | 4 | signed integer | Start NPT (msecs) |
| Stop NPT | 4 | signed integer | Stop NPT (msecs) |
| Scale Num | 2 | signed integer | Scale Numerator |
| Scale Denom | 2 | unsigned integer | Scale Denominator |

An RTSP and corresponding ISA fast forward example will now be provided. The RSTP/ISA proxy of the present invention would convert between the two formats in accordance with the invention.

RTSP Fast Forward Example:

```
PLAY rtsp://isa-proxy-server.com:554 RTSP/1.0
CSeq: 303
Session: 7001
Range: npt=0- scale=10/1
100001 maps to Sopranos Season 1 - Episode 1
```

ISA Fast Forward Example:

```
Version: 2.0
Transaction ID: 303
Op Code: 0x6
Status Code:
Stream Handle: 7001
Start NPT: 0
Stop NPT: 0x7FFFFFFF
Scale Num: 10
Scale Denom: 1
```

As can be appreciated, the ISA/RTSP proxy can convert between formats in either direction, e.g., from RTSP to ISA or from ISA to RTSP as may be required.

While described in the context of a video on demand system, it should be appreciated that the methods and apparatus of the present invention are not limited to the delivery of video content and can be used to support delivery of audio content and/or other types of information content which may be requested by an IP based CPE device.

In various embodiments system elements described herein are implemented using one or more modules which are used to perform the steps corresponding to one or more methods of the present invention, for example, encoding file compression, data rearrangement, file header generation, etc. Such modules may be implemented using software, hardware or a combination of software and hardware. Each step may be performed by one or more different software instructions executed by a processor, e.g., CPU.

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A content distribution system, the system comprising:
a video on demand server;
an IP business management device configured to perform at least one of a billing function and an authorization function relating to content delivery requests initiated by an IP customer premise device which supports a first protocol;
a second business management device configured to perform billing functions relating to services provided by said video on demand server, said second business management device supporting a second protocol which is different from said first protocol; and
a protocol converter device in communication with said second business management device, said IP business management device, said IP customer premise device and said video on demand server, said protocol converter device being configured to convert command signals which are in accordance with the first protocol which is used by said IP customer premise device, but which is not supported by said video on demand server, to command signals in accordance with the second protocol to which said video on demand server is responsive;

wherein, said protocol converter device is further configured to convert signals from said IP business management device directed to said second business management device from said first protocol to said second protocol and to convert signals sent from said second business management device to said IP business management device from said second protocol to said first protocol thereby allowing said IP business management device and said second business management device to interoperate using said first and second protocols.

2. The system of claim 1, wherein said video on demand server is a network based video recorder device which provides network personal video recorder functionality in response to one or more ISA protocol compliant signals.

3. The system of claim 1,
wherein said second business management device is a cable network business management device for performing billing functions relating to video on demand services provided by said video on demand server; and
wherein said first protocol is an RTSP protocol and wherein said second protocol is an Interactive Services Architecture protocol.

4. The system of claim 1, further comprising:
a video redirector device configured to receive video content from said video on demand server and to forward said video content as an IP stream to said IP customer premise device.

5. The system of claim 4, wherein said video redirector packetizes said video content.

6. The system of claim 5, wherein said video redirector device is configured to reformat said video content from a first encoding format to a second encoding format prior to delivery to said customer premise device.

7. The system of claim 4, further comprising:
a broadband network coupling said IP customer premise device to said protocol converter device, said IP business management device and to said video redirector device.

8. The system of claim 7, wherein said IP customer premise device is a personal computer, the system further comprising:
a plurality of set top boxes in communication with said video on demand server.

9. A method for use in delivering content, the method comprising:
operating an IP business management device to process a content delivery request from an IP customer premise device;
operating the IP business management device to send a first command signal in a first format corresponding to a first protocol to initiate delivery of the requested content, said IP business management device supporting IP based content delivery, a second business management device supporting a second command format which is different from said first command format;
operating a protocol converter device to convert said first command signal from said first format to said second format, said second format corresponding to a second protocol which is different from a first protocol used by said IP business management device, said protocol conversion producing a second signal;
operating the second business management device to process said second signal and signal a video on demand server to provide requested content; and
operating said protocol converter device to convert presentation control signals received from said IP customer premise device into a format to which said video on demand server is responsive while said requested content is being provided by said video on demand server.

10. The method of claim 9, wherein said video on demand server is a network based video recorder device which provides network personal video recorder functionality in response to one or more ISA protocol compliant signals.

11. The method of claim 10, further comprising:
operating the video on demand server to begin supplying the requested content to a video redirector device.

12. The method of claim 11, further comprising:
operating the video redirector device to generate an IP packet stream including at least some of the content to be delivered, packets in said IP packet stream including an IP addresses corresponding to a customer premise device.

13. The method of claim 12, wherein operating the protocol converter device to convert said first signal includes converting from said first signal format to an ISA signal format.

14. The method of claim 13, wherein said first format is an RTSP signal format.

15. The method of claim 12, further comprising:
operating the video redirector device to perform an encoding format conversion operation to produce said IP packet stream.

16. The method of claim 15, further comprising:
operating the video redirector device to perform a data rate shaping operation when producing said IP packet stream.

17. The method of claim 12, further comprising:
operating said protocol converter device to receive a video playback control signal from said customer premise device; and
operating said protocol converter device to perform a protocol conversion operation on said video playback control signal to convert said signal to a protocol format supported by said video on demand server, said conversion producing a second video playback control signal.

18. The method of claim 17, further comprising:
operating said video on demand server to receive said second video playback control signal and to modify the video stream being supplied to said video redirector device in accordance with said video playback control signal.

19. The method of claim 18,
wherein said video control playback signal is one of a fast forward and a reverse signal; and
wherein the method further comprises:
operating an IPTV stream server to send a plurality of IP TV streams to a plurality of different IP based customer premise devices.

* * * * *